March 27, 1951  J. MILLER  2,546,767
POTATO SLICER AND SPREADER
Filed Feb. 14, 1949  4 Sheets-Sheet 2

John Miller
INVENTOR.

BY *Clarence A. O'Brien*
*and Harvey B. Jacobson*
Attorneys

March 27, 1951

J. MILLER 2,546,767

POTATO SLICER AND SPREADER

Filed Feb. 14, 1949

John Miller
INVENTOR.

BY Clarence A. O'Brien
and Harvey B. Jacobson
Attorneys

March 27, 1951      J. MILLER      2,546,767
POTATO SLICER AND SPREADER
Filed Feb. 14, 1949      4 Sheets-Sheet 4
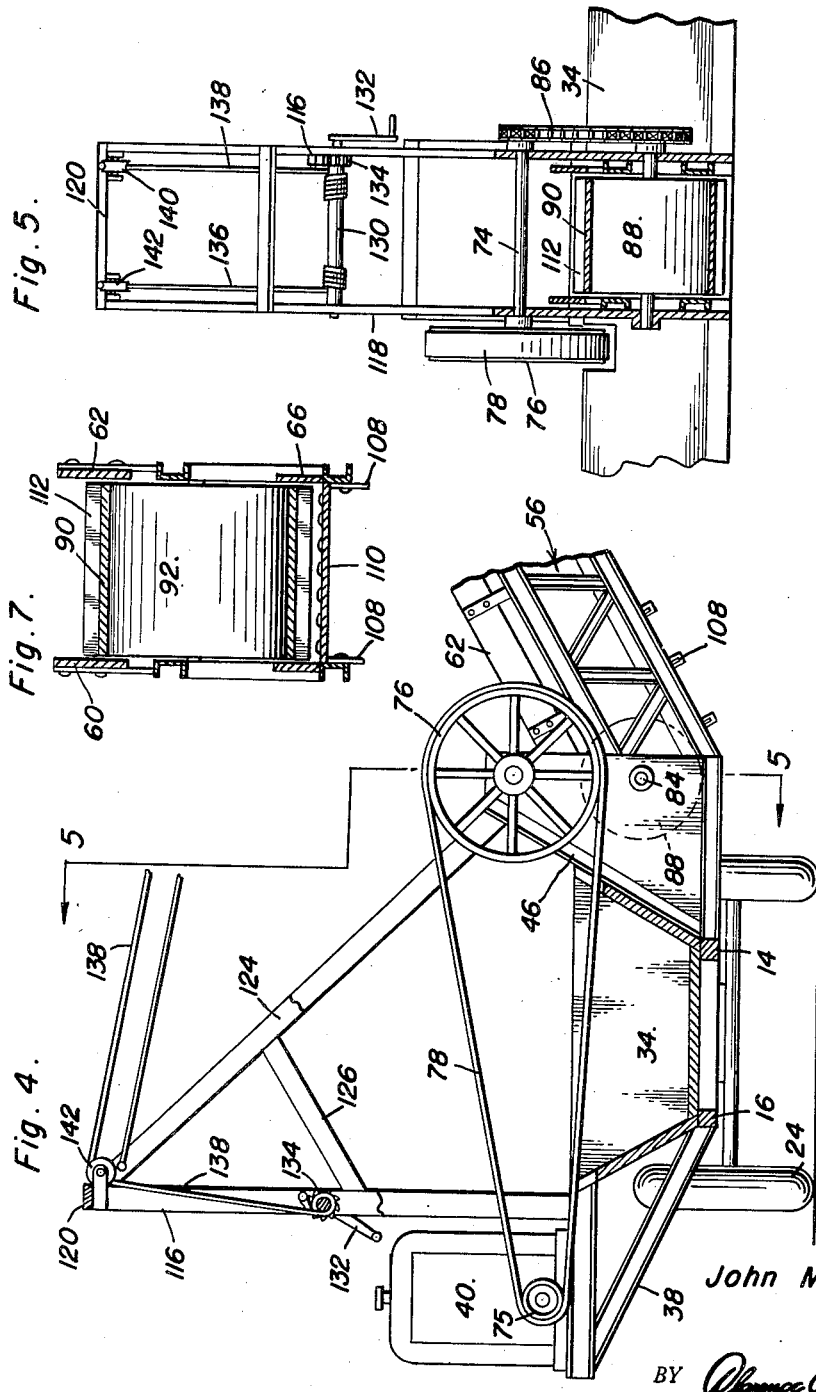
John Miller
INVENTOR.

Patented Mar. 27, 1951

2,546,767

UNITED STATES PATENT OFFICE 2,546,767

POTATO SLICER AND SPREADER

John Miller, Wasco, Calif.

Application February 14, 1949, Serial No. 76,276

4 Claims. (Cl. 146—164)

This invention relates to a device for handling potatoes or other similar produce and has for its primary object to distribute potatoes for drying before the same are used for animal feed, preparation of flour and alcoholic purposes.

Another important object of this invention is to slice or cut potatoes into small segments or chips and distribute or spread the chips upon the ground in a uniform manner for drying purposes.

Yet another object of this invention is to construct a machine for handling and slicing potatoes, which machine may have its parts readily and quickly adjusted so as to adapt the machine to work under various conditions, to be easily moved over the ground and, at the same time, to automatically slice a number of potatoes into chips or slices and deposit the same on the ground, so that the chips or slices may be rapidly and thoroughly dried.

A meritorious feature of this invention resides in the provision of a wheeled bin or hopper, through which an endless conveyor revolves; the latter having means for removing a number of the potatoes or the like products from the hopper carrying the same across rigid cutters; which extend laterally in a vertical adjustable manner, from the bin, whereby the potatoes are cut into chips or small pieces and are allowed to fall to the ground for drying purposes in a uniform manner.

These and ancillary objects and other structural features of merit are attained by this invention, a preferred embodiment of which is set forth in the following description and illustrated in the accompanying drawings, wherein:

Figure 4 is a detail fragmentary and elevational view;

Figure 5 is an enlarged sectional view taken substantially on line 5—5 of Figure 4;

Figure 6 is a view in perspective of a portion of the rigid cutter, and;

Figure 7 is a sectional view taken on line 7—7 of Figure 3.

Figure 1:
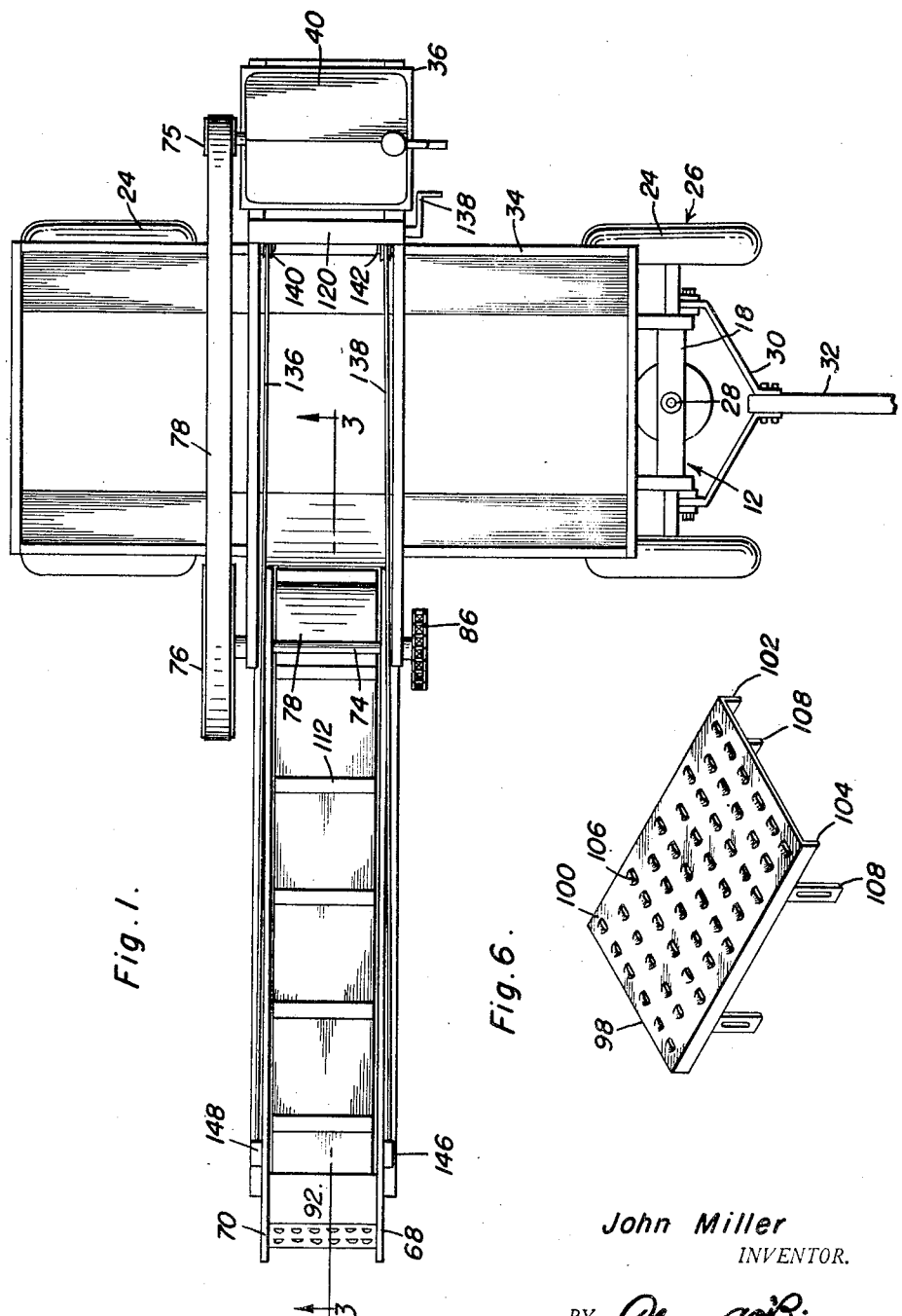
Figure 1 is a top plan view of a machine, constructed in accordance with the principles of the instant invention, and capable of carrying out the objects of the instant invention.
Figure 2:
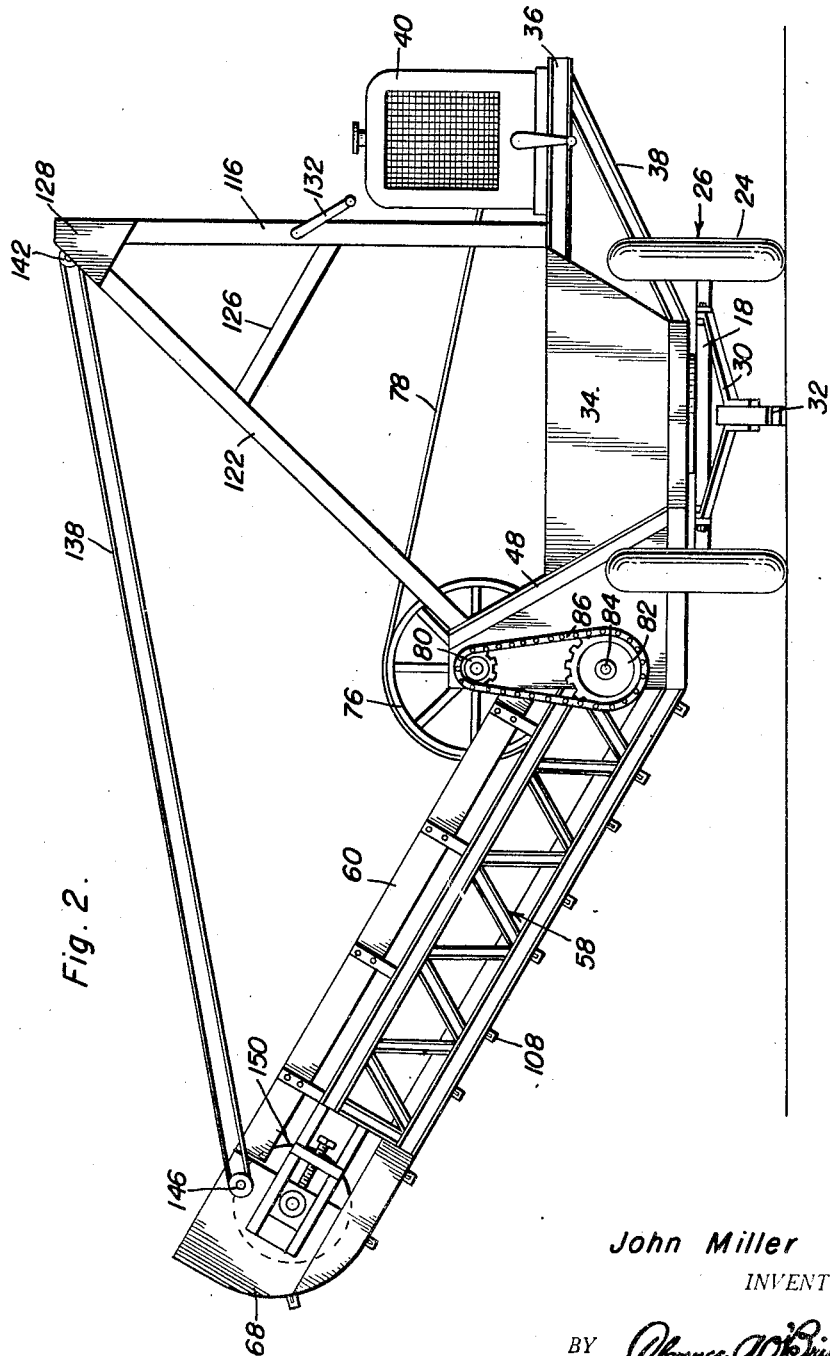
Figure 2 is an end elevational view thereof.

At the present time, surplus potatoes are allowed to dry in a field, before the same are employed for animal feed, dairy feed, flour or other analogous purposes. The potatoes are merely spread, in the form as taken, on the ground by shovelling the same from the wheeled hopper, wagon or the like or by otherwise removing the potatoes from the carrier and throwing them on the ground. However, the drying of the potatoes, in the conventional manner, involves considerable waste, since some of the potatoes are liable to rot if they dry prior to the majority of the potatoes and, further, involves a great deal of space and inconvenience. Also, a sanitary problem is involved in that when the potatoes are drying, an unpleasant odor is present and a great deal of insects are drawn to the drying potatoes.

Inasmuch as a large number of whole potatoes require a period of two or three months for the drying process to be complete, the same provides a breeding place for flies, tuber moths and the like insects.

Therefore, it is the primary aim and purpose of this invention to provide a novel means for drying the potatoes, whereby the present drying process may be obviated and the defects attendant therewith may be corrected. With the device, constructed in accordance with the instant invention, the potatoes may be easily and conveniently cut into small pieces and deposited uniformly on the ground, where the chips or pieces will be thoroughly dried in about five or ten hours. It can, thus, be appreciated that the time involved is considerably less, since the same number of potatoes, when cut into chips and distributed evenly on the ground, will dry in about ten hours, whereas the conventional method of drying the potatoes requires two or three months.

Referring now more particularly to the drawings, this invention, generally designated by the character reference 10, includes a frame 12 formed by a pair of opposed longitudinally extending bars or members 14 and 16, which are joined at their opposite ends by transversely disposed end members 18. Axles 20 are secured to the frame by the opposing end of gripes or U-shaped brackets 22. Wheels 24 are rotatably carried by the opposing ends of the axles 20.

The front wheel assembly 26 is swivelly mounted to the front portion of the frame as at 28 and is provided with a yoke 30 to which is attached a draw bar 32, whereby the frame may be coupled to a tractor or similar powered unit and pulled over the ground. A hopper or bin 34 is mounted on the frame for carrying the potatoes or like produce and is formed with vertically disposed end walls and downwardly and inwardly slanting longitudinally extending opposed side walls. A shelf or platform 36 extends laterally from the upper edge of one of the side walls of the bin and is rigidified and retained in a horizontal position by brace bars or rods 38 secured to the frame. A prime mover 40, such as the internal combustion engine illustrated, is supported on the shelf, for a purpose to be described.

An opening 44 is formed in the opposing side wall of the bin and a pair of opposing baffle plates 46 and 48 extend outwardly from the bin at opposite sides of the opening and terminate beyond the side wall of the bin. A bottom wall 50 extends laterally from the bottom wall of the housing defining a prolongation of the bottom wall and is positioned between the lower edges of the opposing baffles 46 and 48. The bottom wall terminates in an unattached arcuate end 52.

A housing 54 projects outwardly from the bin and is pivotally disposed between the opposing baffle plates. The housing 54 includes a pair of opposing side members 56 and 58. Elongated side bars 60 and 62 are supported on the upper edges of the side members by means of connecting bars 64, whereby the side bars are spaced upwardly from the upper edges of the side members. Similarly, side bars 66 are supported on the lower edges of the opposing side members. Opposing baffle plates 68 and 70 are formed at the unattached ends of the side members and are joined by a transversely disposed baffle 72 connected to the upper edges of the baffles 68 and 70.

A shaft 74 is transversely journaled to the upper ends of the opposing baffles plates 46 and 48 and a pulley wheel 76 is fixed on one of the extending ends thereof. The pulley wheel 76 is drivingly connected with a smaller pulley 78 fixed on the extending end of the driving shaft of the prime mover 40 by means of a belt 78. A small gear 80 is carried by the opposing end of the shaft 74 and is drivingly associated with the gear 82 fixed on one end of an axle 84 by means of a connecting chain 86. A drum 88 is carried by the shaft 84 and is rotatably disposed between the opposing baffles 46 and 48. An endless conveyor or belt 90 is trained around the drum 88 and around a drum 92 rotatably carried by a shaft 94 transversely journaled between the opposing end baffles 68 and 70.

Cutting or slicing means 96 is transversely disposed between the bottom bars 66 of the opposing side members and preferably includes a plurality of longitudinally extending plates 98 having a body plate 100 formed with lateral flanges 102 and 104 disposed at the opposing longitudinal side edges thereof. The body proper is formed with a plurality of aligned and staggered cutters 106, in a manner familiar to the art. Slotted straps 108 extend integrally from the free edges of the flanges and are attached to the opposing lower bars of the sides of the housing in an adjustable manner. Thus, suitable fastening means 110 is disposed in the elongated slots in the straps and secured to the opposing bars, so that the cutting plates may be adjusted with respect to the conveyor for defining the shape of the chips or slices of potatoes.

Figure 3:
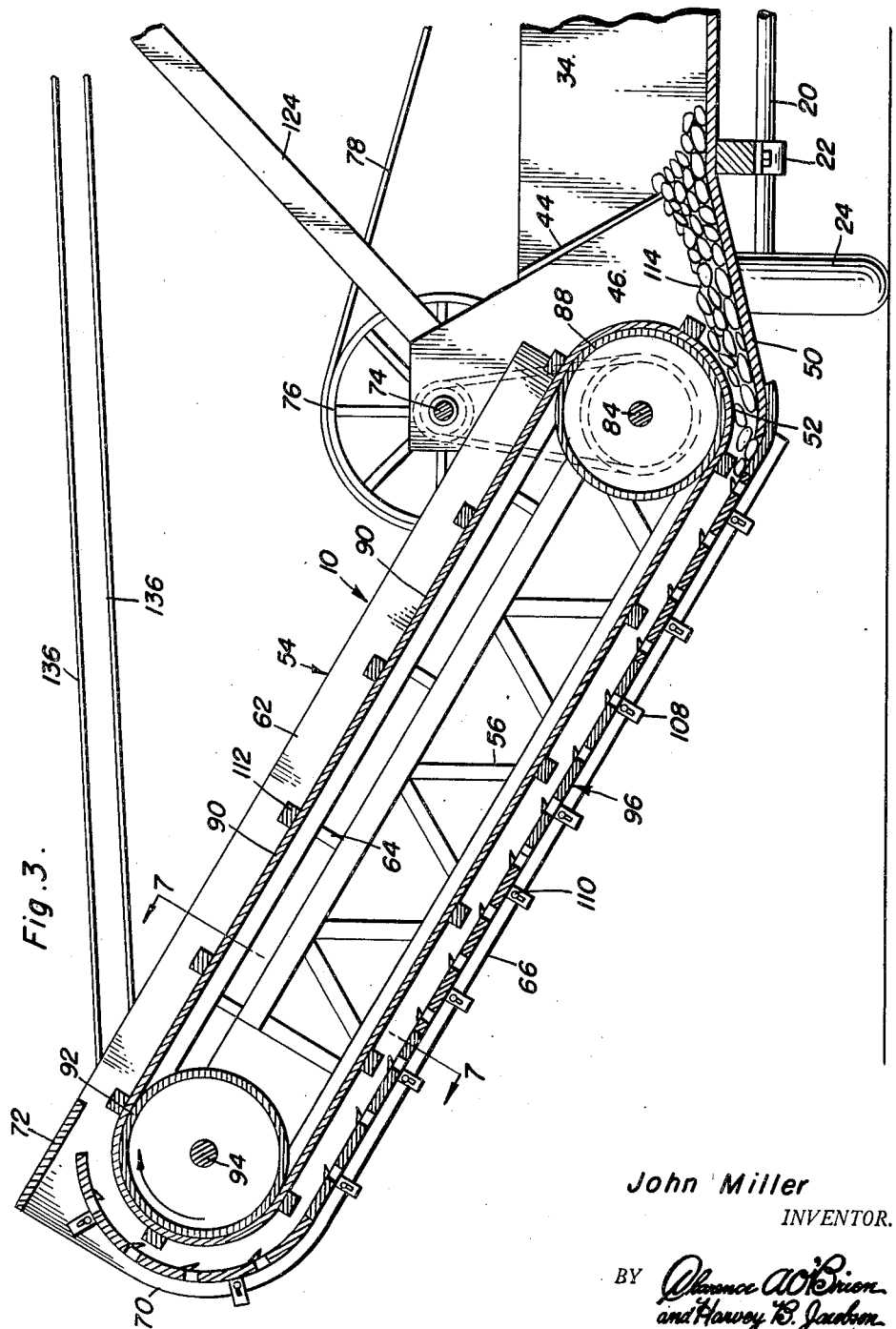
Figure 3 is a vertical longitudinal sectional view taken substantially on the line 3—3, and illustrating the endless conveyor and rigid cutter associated therewith.

In the latter respect, it is to be noted that a plurality of transversely disposed longitudinally spaced bars or similar members 112 are formed on the outer face of the conveyor belt 90. The bars constitute the means whereby the potatoes 114 are removed from the bin and carried into engagement of the cutters 106. Thus, with reference to Figure 3, it is to be noted that the members 112 remove the potatoes 114 from the bottom wall 50 and carry the potatoes 114 into engagement with the cutters which can be adjusted thereto for determining the thickness of the slices. Of course, any of the potatoes which are not completely sliced during the first rotation of the conveyor belt are returned to engagement with the cutters and are maintained in such engagement, until they are completely sliced. The baffle plates 72 and the opposing top bars 62 and 60 will prevent the accidental dislodgement from the housing of any of the uncut potatoes.

It is advantageous to provide means for raising and lowering the housing since, in that manner, the potato chips or slices may be spread over a larger or smaller area, depending upon the ground conditions and quantity of potatoes. In this respect, a pair of opposed bars or standards 116 and 118 are vertically disposed on the shelf 36. A brace bar 120 is transversely disposed between the upper ends of the standards 116 and 118 and supporting or bracing bars 122 and 124 extend diagonally downwardly from the upper ends of the standards, the bracing bars having their lower ends secured to the opposing baffle plates 46 and 48. Rigidifying bars 126 are disposed between the standards and the bracing bars. The upper ends of the bracing bars or standards are secured by connecting members 128. A winding drum 130 is transversely journaled between the standards 116 and 118 and is provided with a crank 132 secured to one of the extending ends thereof. A pawl and ratchet 124 is carried by the drum and standard 116 to prevent undesired unreeling or unwinding of the drum and to lock the same in a desired position. Cables 136 and 138 are carried by the drum and are entrained through pulleys 140 and 142, the latter being secured to the upper bar 120 in a conventional manner.

The cables are trained over sheaves 146 and 148 rotatably carried by the opposing baffle plates 68 and 70. Thus, by winding the drum 130, the housing can be raised and lowered to the desired position and retained in such position by suitable locking means, such as the pawl and ratchet 134. Of course, if desired, other conventional locking means can be readily and easily substituted. It is to be particularly pointed out, with respect to Figure 3, that the unattached end 52 of the bottom wall 50 and the inner end of the cutter or inner section of the cutter sections 96 overlap in sliding engagement. Thus, regardless of the position of the housing, whether raised or lowered, the bottom wall and inner section of the cutter units will be in engagement to prevent the potatoes 114 from falling out, before they are brought into engagement of the cutters by the conveyor.

In operation, a quantity of potatoes are placed in the bin and the same is then moved over the ground by attaching the drafting structure to a tractor or other powered vehicle. The prime mover 40 is then placed in operation, but, it is to be understood that the conventional power take-off unit of the tractor may be employed for rotating the conveyor by means of a belt transmission system or the like. However, by way of example only, the device is shown in connection with an operating means separate from the tractor. As the conveyor is rotated, the potatoes or the like produce are brought into engagement with the cutters by means of the members carried by the conveyor. The potatoes are thus sliced and the chips or slices will fall through the perforations and the cutter plates and will thus be spread on the ground. It is to be particularly realized that in the event the potatoes are not sliced completely, the conveyor after one revolution will turn the partly sliced potatoes to the cutter plates for completely slicing the same.

It can be seen that there is provided a novelty constructed device, which will effectively and efficiently operate and in such operation will slice a plurality of potatoes or the like and deposit the same or scatter the same over the ground, whereby the chips or slices may be dried without any waste, within a small space and within a minimum of time. Of course, after the chips are dried, a conventional sweeping machine or similar pickup device may be employed for removing the chips from the ground and transporting the same to a suitable storage or bagging place.

If desired, means, 150, may be provided for tightening the conveyor or loosening the same, as desired.

While only one embodiment of this invention is shown and claimed, limitation is only sought in accordance with the appended claims.

Having described the invention, what is claimed as new is:

1. In a potato slicing device, the combination of a wheeled hopper, a laterally extending elongated channel shaped housing pivotally carried by the hopper, an endless rotary conveyor operatively mounted longitudinally in the housing, means for rotating said conveyor, cutting means formed along the entire length of the bottom wall of the housing and disposed adjacent the lower reach of said conveyor, means for adjusting said cutting means, and means for raising and lowering the housing.

2. A potato spreading apparatus comprising a wheeled hopper having an opening formed in one of its walls, an elongated channel shaped housing pivotally carried at one end by the hopper and extending outwardly therefrom, said housing being aligned with the opening in the hopper, cutter members disposed along the entire length of the bottom wall of the housing and a rotary conveyor mounted in the housing and having a lower reach passing over the bottom wall of the housing, and means formed on the conveyor for extracting potatoes from the hopper and moving them over the bottom wall.

3. A potato spreading apparatus comprising a wheeled hopper having an opening formed in one of its walls, an elongated channel shaped housing pivotally carried at one end by the hopper and extending outwardly therefrom, said housing being aligned with the opening in the hopper, cutter members disposed along the entire length of the bottom wall of the housing and a rotary conveyor mounted in the housing and having a lower reach passing over the bottom wall of the housing, means formed on the conveyor for extracting potatoes from the hopper and moving them over the bottom wall, and means for raising and lowering the housing and locking it in selected angular positions relative to the hopper.

4. A potato spreading device comprising a hopper having an opening formed in one of its walls, a housing pivotally carried at one end by said hopper and extending outwardly therefrom and in alignment with said opening, said housing including elongated parallel side walls and cutter members forming the bottom wall of said housing, a rotary conveyor mounted in the housing and having a lower reach passing over the bottom wall of the housing, and means formed with said conveyor for extracting potatoes from the hopper and moving them over the cutter members.

JOHN MILLER.

REFERENCES CITED

The following references are of record in the file of this patent:

UNITED STATES PATENTS

| Number | Name | Date |
| --- | --- | --- |
| 452,034 | Platschart | May 12, 1891 |
| 1,012,214 | Mitchell et al. | Dec. 19, 1911 |
| 1,044,070 | Mower | Nov. 12, 1912 |
| 1,961,009 | Nachtigal | May 29, 1934 |